(12) United States Patent
Eisenhardt et al.

(10) Patent No.: US 6,445,168 B2
(45) Date of Patent: Sep. 3, 2002

(54) POWER OUTPUT CIRCUIT HAVING A PULSE-WIDTH MODULATION MODE AND A PERMANENTLY CLOSED MODE

(75) Inventors: Harald Eisenhardt, Rutesheim; Rolf Falliano, Steinenberg, both of (DE)

(73) Assignee: Robert Bosch GmbH, Stuttgart (DE)

( * ) Notice: Subject to any disclaimer, the term of this patent is extended or adjusted under 35 U.S.C. 154(b) by 64 days.

(21) Appl. No.: 09/137,004

(22) Filed: Aug. 20, 1998

(30) Foreign Application Priority Data

Aug. 21, 1997 (DE) ......................... 197 36 338

(51) Int. Cl.$^7$ ................................. G05F 1/40
(52) U.S. Cl. .................. 323/284; 323/299; 323/351
(58) Field of Search ..................... 323/299, 284, 323/351; 363/41

(56) References Cited

U.S. PATENT DOCUMENTS 4,692,854 A * 9/1987 Baxter et al. .................. 363/75
4,959,606 A * 9/1990 Forge .......................... 323/286
5,594,631 A * 1/1997 Katoozi et al. ................ 363/41
5,617,016 A * 4/1997 Borghi et al. ................ 323/284

* cited by examiner

Primary Examiner—Gregory Toatley
Assistant Examiner—Gary L. Laxton
(74) Attorney, Agent, or Firm—Kenyon & Kenyon

(57) ABSTRACT

A power output circuit having a pulse-width modulation generator and an upstream closed-loop control circuit which switches the pulse-width modulation generator and the power output stage to a permanently open mode, a PWM mode having pulse-width-modulated pulses, and a permanently closed mode as a function of a preset external setpoint, an actual value of the power output stage, and a reference voltage derived from the supply voltage. High power loss and high EMC in the full-load threshold region are avoided by prematurely switching from the PWM mode to the permanently closed mode as a function of a preset setpoint and the supply voltage, and returning to the PMW mode with a hysteresis of these values.

7 Claims, 4 Drawing Sheets

PERMANENTLY CLOSED MODE

PERMANENTLY OPEN MODE

PULSE-WIDTH
MODULATION (PWM) MODE

PWM MODE

POWER OUTPUT CIRCUIT HAVING A PULSE-WIDTH MODULATION MODE AND A PERMANENTLY CLOSED MODE

FIELD OF THE INVENTION

The present invention relates to a power output stage circuit having an automatically controlled pulse-width modulation generator and an upstream closed-loop control circuit. The upstream closed-loop control circuit switches the pulse-width modulation generator and the power output stage to a permanently open state, to a PWM mode having pulse-width modulated pulses, and to a permanently closed state as a function of a preset external setpoint, an actual value of the power output stage, and a reference voltage derived from the supply voltage.

BACKGROUND INFORMATION

With a conventional power output circuit, there is the danger of the power output stage no longer being accurately clocked shortly before the transition from PWM mode to permanently closed mode. This is especially true when the interpulse periods at the threshold of the PWM zone take on approximately the same duration as the switching edges of the control signal pulses. This results in incomplete switching of the power output stage, which increases the power loss in the power output stage. The cooling system for the power output stage must therefore be designed for this increased power loss. In addition, the imprecise clocking of the output stage increases the EMC value, as a result of the bursts that occur. Moreover, the pulse packets produce audible low-frequency oscillations.

SUMMARY OF THE INVENTION

An object of the present invention is to provide a power output circuit which avoids an increased power loss and high EMC value, particularly at the transition from PWM mode to a permanently closed power output stage. It is also possible to reduce the costs of cooling the power output stage using the power output circuit according to the present invention.

The power output circuit according to the present invention achieves this object by prematurely switching from PWM mode to permanently closed mode as a function of a preset setpoint and the supply voltage and then returning to PWM mode with a hysteresis of these values.

The early transition from PWM mode to permanently closed mode and the return from permanently closed mode to PWM mode via a hysteresis avoids the threshold having short periods that is critical for the increase in power loss and elevated EMC value.

The early transition can be very easily initiated by supplying the closed-loop control circuit with an additional bias voltage which, in conjunction with a preset setpoint that is smaller than the setpoint producing the maximum pulse width by a specific amount, abruptly and prematurely switches the pulse-width modulation generator and the power output stage to the permanently closed state.

When it reaches the value defined by the additional bias voltage, the setpoint causes the closed-loop control circuit to abruptly switch the pulse modulation generator and the power output stage to the permanently closed state even before the maximum setpoint is reached. This reliably avoids voltage peaks in the output voltage of the power output stage which result in a higher power loss. It also maintains a low EMC value, making it possible to reduce cooling costs, since the power loss and therefore the heat to be dissipated in the power output stage did not increase during this transition to full load, i.e. to the permanently closed state.

According to one embodiment of the present invention, the point at which early switching to the permanently closed state occurs is defined so that the preset setpoint corresponds to a pulse width of 95% of the maximum pulse width (period). Steps are taken, in particular, to reduce, compared to the period, the pulse width obtained with the preset setpoint by a duration that is longer than the times of the pulse switching edges in PWM mode.

According to another embodiment of the present invention, the power output circuit is designed so that the closed-loop control circuit has a voltage regulator whose non-inverting control input is supplied with the reference voltage and whose inverting control input is supplied with the setpoint via a resistor and the output voltage of the power output stage via another resistor as the actual value; the voltage regulator emits a control voltage which increases as the setpoint rises. The pulse-width modulation generator has a saw-tooth voltage generator whose output voltage varies periodically between a is lower and upper voltage limit. When the control voltage is less than the lower voltage limit, the pulse-width modulation generator does not send a control signal to the power output stage. When the control voltage is greater than the lower voltage limit but less than the upper voltage limit, the pulse-width modulation generator switches the power output stage to a PWM mode having a increasing pulse width as the setpoint rises. When the control voltage is greater than the upper voltage limit, the pulse-width modulation generator switches the power output stage to the permanently closed state so that it can detect all operating states. In doing this, the abrupt, early transition to the permanently closed state can be easily achieved by supplying the additional bias voltage to the non-inverting control input, by supplying the setpoint to the inverting input of a compensating stage by switching the output potential of the compensating stage from frame potential to positive potential when the preset setpoint corresponds to the bias voltage, by connecting the output of the compensating stage to the non-inverting control input of the voltage regulator via a decoupling diode, and by the fact that the output potential of the compensating stage produces a sudden voltage change at the non-inverting control input of the voltage regulator, resulting in a sudden voltage change for increasing the control voltage and switching the pulse-width modulation generator and the power output stage to the permanently closed state.

The present invention provides an exemplary embodiment of a particular circuit layout. The comparators or operational amplifiers used in the voltage regulator and in the compensating stage can also be controlled in reverse, and the sudden voltage change can also be implemented in the setpoint. The other control operation can act on the output of the voltage regulator so that the control voltage decreases as the setpoint increases. In this case, the pulse width of the control signal reaches its maximum value when the control voltage approaches the lower saw-tooth voltage generator value, and the transition to the permanently closed state occurs when the control voltage drops below the lower voltage limit of the saw-tooth voltage generator. Depending on how the control voltages are laid out and applied to the comparators or operational amplifiers, it may be necessary to reverse the polarity of the decoupling diode.

If the output of the compensating stage is connected via a resistor to the non-inverting control input of the same compensating stage, thereby reducing the bias voltage, which is more or less equivalent to a setpoint that is around 92% of the maximum setpoint, this will achieve a switching hysteresis for early switching to the permanently closed state and a return to PWM mode as the setpoint decreases, thereby preventing the closed-loop control circuit from swinging back and forth.

According to another embodiment of the present invention, the cost of control and the transition from PWM mode to permanently closed mode can be reduced by having a microprocessor control the functions of the voltage regulator and compensating stage.

DETAILED DESCRIPTION

Figure 1:
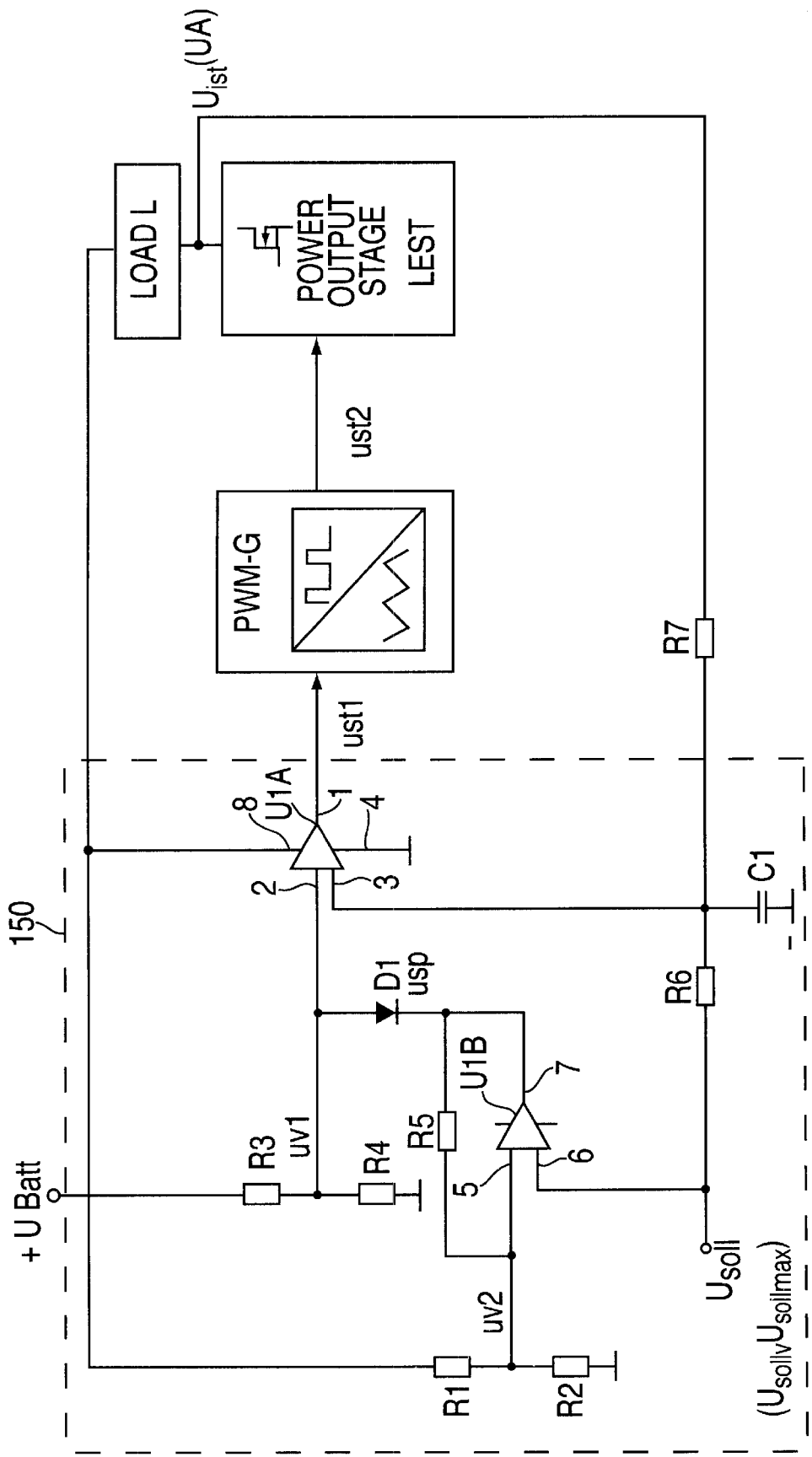
FIG. 1 shows a circuit diagram of a power output circuit having a controller circuit and a compensating stage which switches prematurely from a pulse-width modulation (PWM) mode to a permanently closed state.
Figure 2:
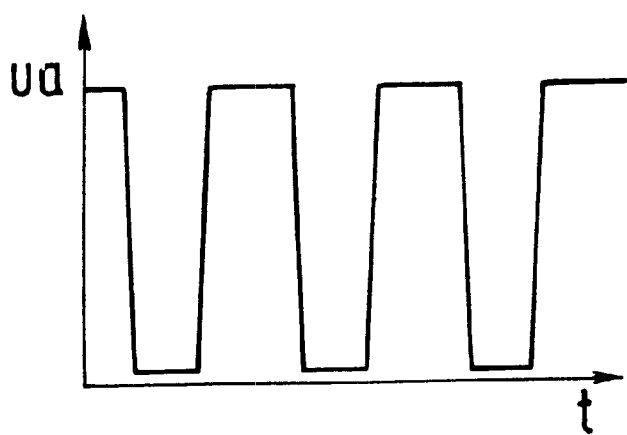
FIG. 2 shows a voltage time diagram of an output voltage at a power output stage.

As shown in FIG. 1, the power output circuit has a power output stage LEST, which can be constructed from one or more parallel-connected power semiconductors, such as FET transistors, and controls a load L. Power output stage LEST is controlled by a control signal ust2 that is emitted by a regulated pulse-width modulation generator PWM-G, which in turn is controlled by a control voltage ustl of a voltage regulator U1A. Pulse-width modulation generator PWM-G has a saw-tooth voltage generator which generates an output voltage that varies periodically between a lower voltage limit and an upper voltage limit (step 504 of FIG. 5; FIG. 6(c) and 6(d)). When control voltage ust1 lies between these two limits of the output voltage of the saw-tooth voltage generator, pulse-width modulation generator PWM-G emits a pulse-width-modulated control signal ust2, having a specific frequency and a pulse width that varies as a function of control voltage ust1 (step 506 of FIG. 5; FIG. 6(e)). When control voltage ust1 is just above the lower limit of the output voltage of the saw-tooth voltage generator, the pulse width of control signal ust2 is very small and takes up the entire period of the output voltage of the saw-tooth voltage generator upon reaching the upper voltage limit of the saw-tooth voltage generator and control voltage ustl, unless steps are taken for early transition to the permanently closed state. The output of the power output stage in the permanently closed state is shown in FIG. 6(a). This transition is usually carried out when control voltage ustl is greater than the upper limit of the output voltage of the saw-tooth voltage generator. Pulse-width modulation generator PWM-G switches to the permanently closed setting when control voltage ustl exceeds the upper limit of the output voltage of the saw-tooth voltage generator. Control signal ust2 switches power output stage LEST to the permanently open state when control voltage ust1 drops below the lower voltage limit of the saw-tooth voltage generator. The output of the power output stage in the permanently open state is shown in FIG. 6(b).

Figure 5:
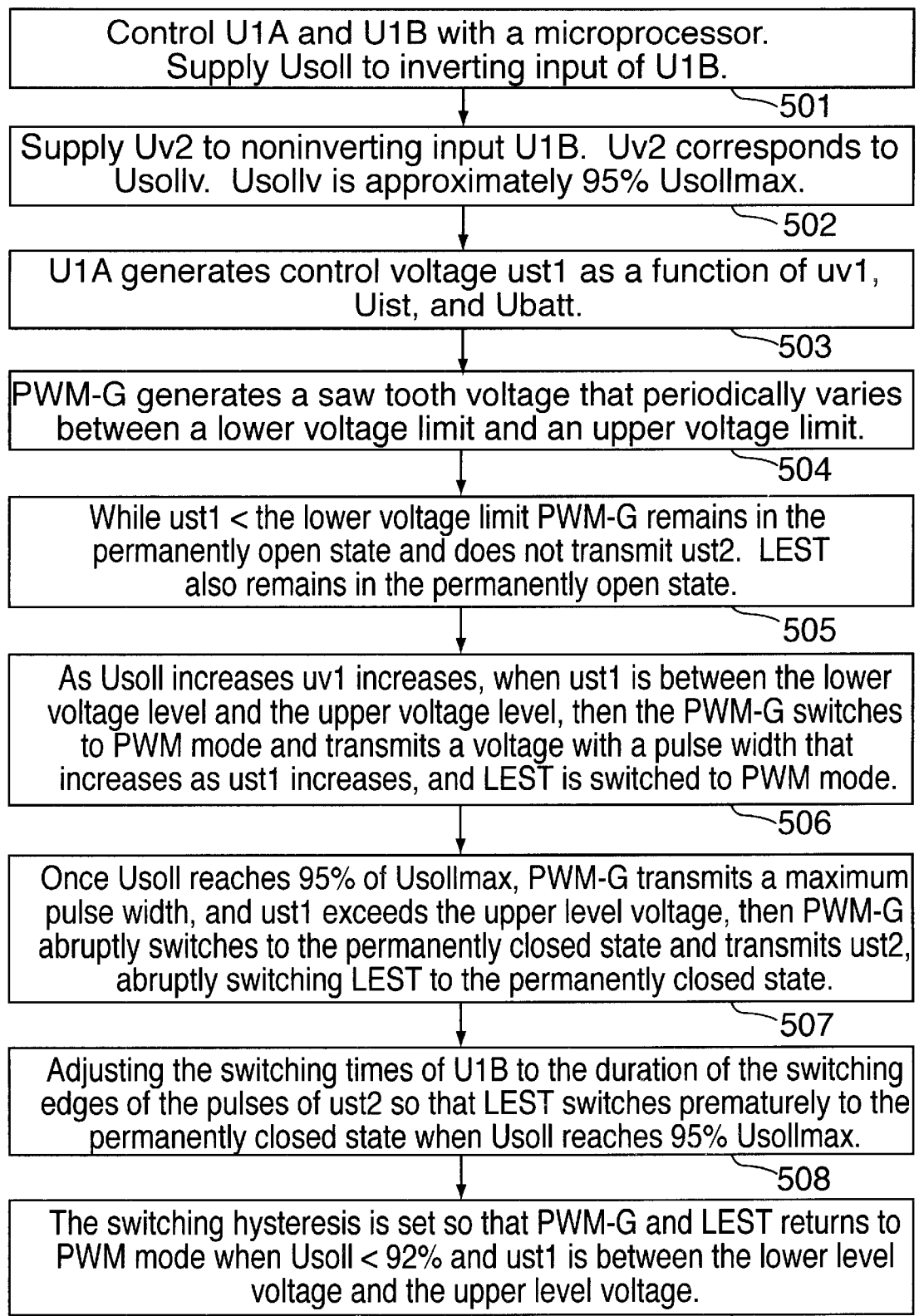
FIG. 5 is a diagram of the operation of the circuit shown in FIG. 1.
Figure 6A:
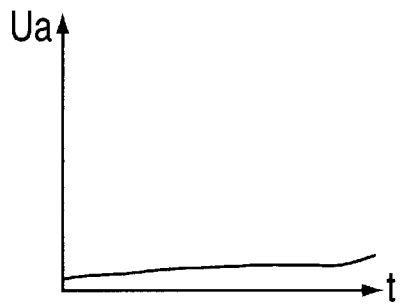
FIG. 6a shows an output of a power output stage according to the present invention in a permanently closed mode.
Figure 6B:
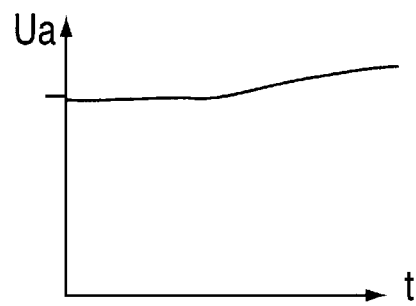
FIG. 6b shows an output of a power output stage according to the present invention in a permanently open mode.
Figure 6C:
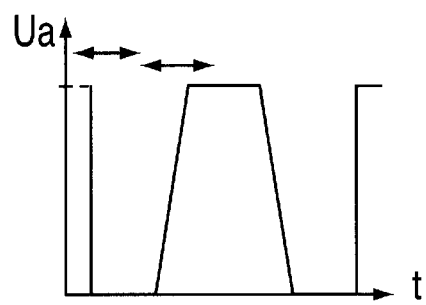
FIG. 6c shows a first embodiment of an output of a power output stage according to the present invention in a pulse-width modulation mode.
Figure 6D:
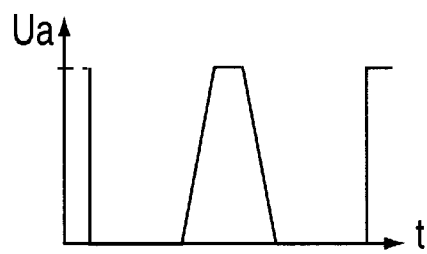
FIG. 6d shows a second embodiment of an output of a power output stage according to the present invention in a pulse; width modulation mode.
Figure 6E:
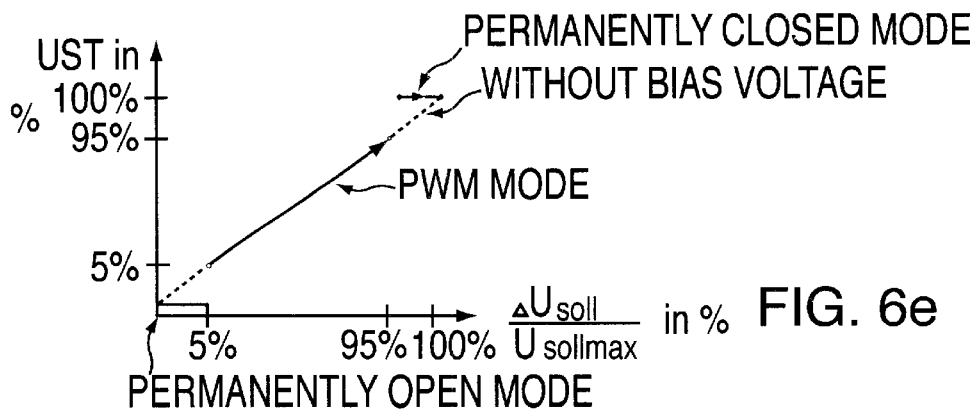
FIG. 6e shows a control voltage according to the present invention in a permanent closed mode, pulse-width modulation mode and a permanently closed mode.

A voltage regulator (comparator) U1A is connected upstream from pulse-width modulation generator PWM-G in order to generate control voltage uts1 (step 503 of FIG. 5). A reference voltage uv1, which is tapped from resistors R3 and R4 at a voltage divider, is supplied to non-inverting control input 2 of comparator U1A (step 503 of FIG. 5). Inverting control input 3 of comparator U1A is supplied with an actual value Uist of power output stage LEST via a resistor R7 and an external setpoint Usoll via a resistor R6 (step 503 of FIG. 5). Actual value Uist thus corresponds to output voltage ua of power output stage LEST. Inverting control input 3 of voltage regulator U1A is also connected to the frame potential of supply output Ubatt via a smoothing capacitor C1 (step 503 of FIG. 5).

Upon starting up the power output circuit, setpoint Usoll is at frame potential, which is then supplied to inverting control input 6 of a compensating stage U1B. As explained above, both the compensation stage U1B and the voltage regulator U1A may be controlled by a microprocessor (step 501 of FIG. 5), which in FIG. 1 is illustrated as block 150. A bias voltage uv2, corresponding to a setpoint Usollv that is around 95% of maximum setpoint Usollmax, is supplied to non-inverting control input 5 of compensating stage U1B from resistors R1 and R2 via the voltage divider (step 502 of FIG. 5). At start-up, output 7 of compensating stage U1B is set to positive potential. The positive potential cannot pass through diode D1 to control input 2 of the voltage regulator. Since, when the power output circuit is started up, actual value Uist is more or less equal to positive potential +Ubatt of the supply voltage, and the. resistive ratio of resistors R3 and R4 as well as resistors R6 and R7 is the same, both control inputs 2 and 3 of the voltage regulator maintain the same potential at uv1 and Uist. Voltage regulator U1A does not emit control voltage ust1. Power output stage LEST is not triggered and remains inactive.

Figure 3:
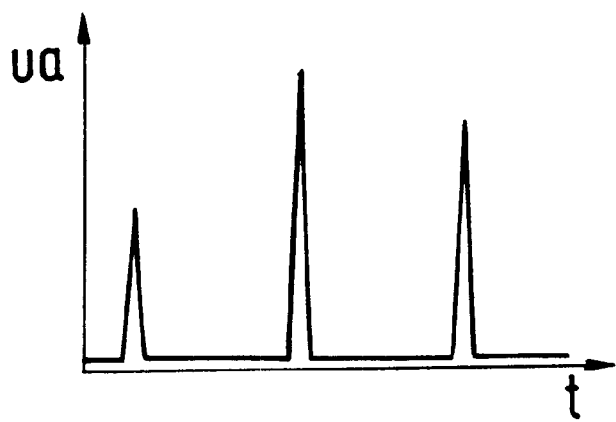
FIG. 3 shows the voltage time diagram of the output voltage having a very short interpulse period of a PWM control signal.

If setpoint Usoll is increased in the positive potential direction, the potential at control input 3 of the voltage regulator exceeds reference voltage uv1, and the voltage regulator emits a control voltage uv1 which increases in proportion to the rise in setpoint Usoll (step 506 of FIG. 5). When control voltage ust1 exceeds the lower limit of the output voltage of the saw-tooth voltage generator, pulse-width modulation generator PWMG generates a pulse sequence in which the frequency is determined by the frequency of the saw-tooth voltage generator, while the pulse width increase as control voltage ust1 rises (step 506 of FIG. 5; FIG. 6(e)). Without compensating stage U1B, the pulse width would take the entire period when control voltage ust1 reaches the upper limit of the output voltage of the saw-tooth voltage generator. However, since power output stage LEST cannot be accurately clocked and switched, especially in this threshold region, voltage peaks in output voltage ua, and therefore in actual value Uist of power output stage LEST occur right in the switching edges, thereby increasing power loss and the EMC value (as can be seen in output voltage ua in FIG. 3).

Figure 4:
FIG. 4 shows the voltage time diagram of the output voltage having a setpoint corresponding to the PWM control signal having the very short interpulse period, however, with a premature switching to the permanently closed state already occurring with this setpoint.

When setpoint Usollv reaches this threshold region, and if it is equal to additionally defined bias voltage uv2 at compensating stage U1B, the potential at output 7 of the compensating stage changes to frame potential of the supply voltage. This produces a sudden voltage change usp at control input 2 of voltage regulator U1A, thereby abruptly increasing the difference with respect to the control voltage present at control input 3. Control voltage ust1 also makes a sudden change, abruptly exceeding the upper limit of the output voltage of the saw-tooth voltage generator. Pulse-width modulation generator PWM-G sends a continuous control signal ust2 to power output stage LEST, explicitly switching the latter to the permanently closed state and maintaining this state. FIG. 4 shows output voltage ua present at power output stage LEST.

This avoids the high power loss in power output stage LEST. It also produces less heat to be dissipated via a heat sink or a similar device, making it possible to reduce cooling costs. The accurate switching performance of the power output stage reduces the EMC value, since no bursts occur. Furthermore, it is not possible to hear any low-frequency oscillations, which would occur with noisy pulse packets.

Output 7 of compensating stage U1B is connected to non-inverting control input 5 of compensating stage U1B via resistor R5 in order to obtain a switching hysteresis. This slightly reduces bias voltage uv2 and, when a reduced setpoint Usoll is reached, causes compensating stage U1B to switch back to frame potential when the latter drops to around 92% of maximum setpoint Usollmax. The power output circuit then returns to PWM mode.

The switching times of compensating stage U1B are adjusted to the duration of the switching edges of the pulses of control signals ust2 so that power output stage LEST switches prematurely to the permanently closed state before the interpulse periods drop below the duration of the switching edges (step 508 of FIG. 5). Setting the permanently closed state when the preset setpoint Usoll reaches around 95% of maximum setpoint Usollmax, at which the output stage would normally switch to permanently closed mode, has been found to be advantageous (step 507 of FIG. 5; FIG. 6(e)). The switching hysteresis is set so that the output stage returns to PWM mode when a preset setpoint Usoll is reached, which is approximately 92% of maximum setpoint Usollmax (step 509 of FIG. 5).

What is claimed is:

1. A circuit arrangement, comprising:
   a power output stage generating an output signal having a signal value;
   a pulse-width modulation generator;
   a closed-loop control circuit positioned upstream from the pulse-width modulation generator and for switching the pulse-width modulation generator and, via the pulse-width modulation generator, the power output stage to a permanently open state, a pulse-width modulation (PWM) mode and a permanently closed state,
   wherein the closed-loop control circuit is configured to switch the pulse-width modulation generator and switch, via the pulse-width modulation generator, the power output stage as a function of a predetermined external setpoint, the signal value of the power output stage and a reference voltage derived from a supply voltage,
   wherein the closed-loop control circuit is configured to prematurely switch, via the pulse-width modulation generator, the power output stage from the PWM mode to the permanently closed state as a function of the predetermined external setpoint and the supply voltage, and switch, via the pulse-width modulation generator, the power output stage back to the PWM mode with a hysteresis of values,
   wherein the closed-loop control circuit receives a bias voltage, and
   wherein the closed-loop control circuit is configured to prematurely and abruptly switch the pulse-width modulation generator and switch, via the pulse-width modulation generator, the power output stage to the permanently closed state as a function of the bias voltage and the predetermined external setpoint, the predetermined external setpoint being smaller than a maximum setpoint which generates a maximum pulse width.

2. The circuit arrangement according to claim 1, wherein the predetermined external setpoint corresponds to a predetermined pulse width which is approximately 95% of a maximum pulse width.

3. The circuit arrangement according to claim 1, wherein a pulse width is decreased to a pulse width which is below a maximum pulse width for a duration that is greater than points of switching edges of pulses in the PWM mode.

4. The circuit arrangement according to claim 1, further comprising a first resistor and a second resistor,
   wherein the closed-loop control circuit includes a voltage regulator having a non-inverting control input and an inverting control input, the non-inverting control input receiving the reference voltage, the inverting control input receiving:
      a further setpoint via the first resistor, and
      a stage output voltage of the power output stage via the second resistor, the stage output voltage corresponding to the signal value of the power output stage,
   wherein the voltage regulator is configured to generate a control voltage, the control voltage rising when the further setpoint rises,
   wherein the pulse-width modulation generator includes a saw-tooth voltage generator for generating a generator output voltage which periodically varies between a lower voltage limit and an upper voltage limit,
   wherein, when the control voltage is less than the lower voltage limit, the pulse-width modulation generator does not send a control signal to the power output stage,
   wherein, when the control voltage is greater than the lower voltage limit and less than the upper voltage limit, the pulse-width modulation generator is configured to switch the power output stage to the PWM mode which has an increasing pulse width as the further setpoint rises, and
   wherein, when the control voltage is greater than the upper voltage limit, the pulse-width modulation generator is configured to switch the power output stage to the permanently closed state.

5. The circuit arrangement according to claim 4, further comprising:

a compensating stage including a further non-inverting control input, a further inverting control input and compensating output, the further non-inverting control input receiving a further bias voltage, the further inverting input receiving the further setpoint, wherein an output potential of the compensating stage switches from a positive potential to a frame potential when the predetermined external setpoint is equal to the further bias voltage, wherein the compensating output is connected to the non-inverting control input of the voltage regulator via a decoupling diode, and wherein the output potential of the compensating stage is configured to generate an abrupt voltage change at the non-inverting control input of the voltage regulator for increasing the control voltage and for abruptly switching the pulse-width modulation generator and the power output stage to the permanently closed state.

6. The circuit arrangement according to claim 5, wherein the compensating output of the compensating stage is connected, via a further resistor, to the further non-inverting control input of the compensating stage for reducing the further bias voltage which corresponds to the further setpoint, the further setpoint being approximately 92% of a maximum setpoint.

7. The circuit arrangement according to claim 6, further comprising:

a microprocessor configured to control the voltage regulator and the compensating stage.

* * * * *